Figure 1:
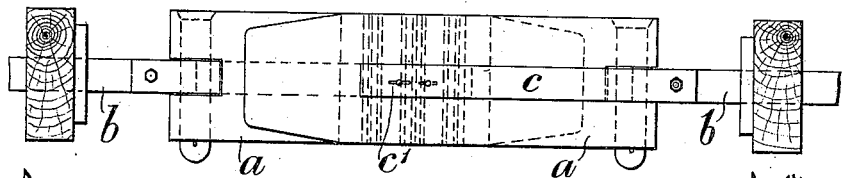

No. 856,098. PATENTED JUNE 4, 1907.
R. B. PARSONS.
AUTOMATIC COUPLING FOR RAILWAY VEHICLES.
APPLICATION FILED JAN. 18, 1907.

2 SHEETS—SHEET 1.

Witnesses,
Geo. F. Byrne
J. S. Wilkinson, Jr.

Inventor
R. B. Parsons,
by Wilkinson + Fisher
Attorneys

No. 856,098. PATENTED JUNE 4, 1907.
R. B. PARSONS.
AUTOMATIC COUPLING FOR RAILWAY VEHICLES.
APPLICATION FILED JAN. 18, 1907.
2 SHEETS—SHEET 2.
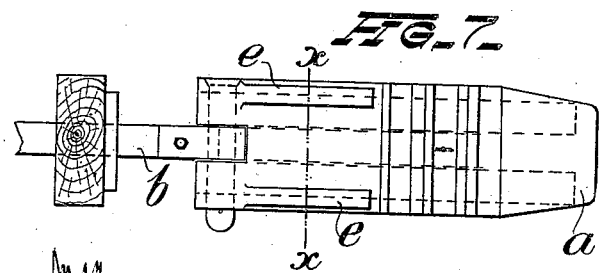
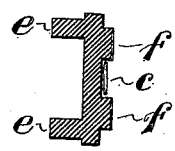
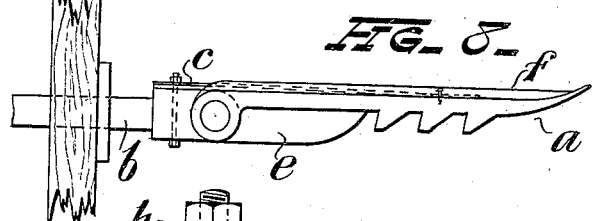
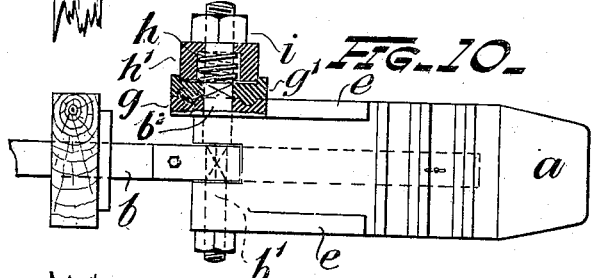
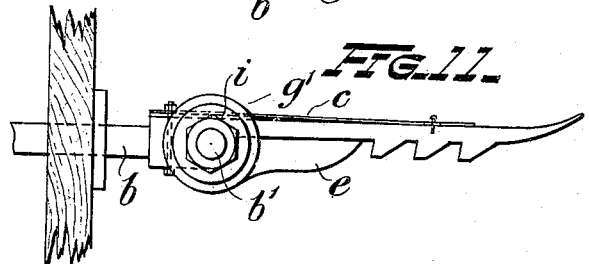
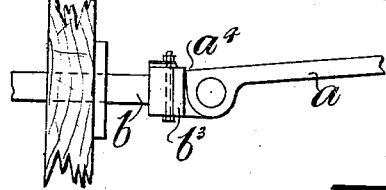
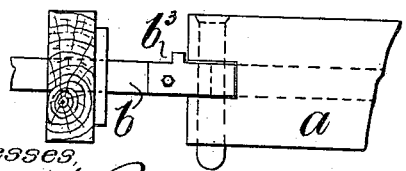
Witnesses
Geo. H. Bipree
J. S. Wilkinson, Jr.
Inventor,
R. B. Parsons,
Wilkinson & Fisher
Attorneys.
THE NORRIS PETERS CO., WASHINGTON, D. C.

UNITED STATES PATENT OFFICE.

REGINALD BOWDEN PARSONS, OF HULL, ENGLAND.

AUTOMATIC COUPLING FOR RAILWAY-VEHICLES.

No. 856,098.　　　　　Specification of Letters Patent.　　　　　Patented June 4, 1907.

Application filed January 18, 1907. Serial No. 352,989.

*To all whom it may concern:*

Be it known that I, REGINALD BOWDEN PARSONS, a subject of the King of Great Britain and Ireland, residing at Hull, in the county of York, England, have invented certain new and useful Improvements in Automatic Couplings for Railway-Vehicles; and I do hereby declare the following to be a full, clear, and exact description of the invention, such as will enable others skilled in the art to which it appertains to make and use the same.

This invention comprises certain improvements in automatic couplings for railway carriages and other vehicles, in which the couplings are attached directly to the draw-bars of the carriages, so that when the carriages are shunted together, they at once lock themselves automatically after the manner described in the specification of the previous Letters Patent No. 835,914, dated 13th November 1906.

The object of my present improvements is to combine with the advantages set forth in the aforesaid specification the drawing of the carriages together buffer-tight in the manner hitherto effected by means of cramps or right and left handed screws, and to carry out this further advantage by a simple construction which will couple automatically and so draw together or couple passenger carriages buffer-tight in the one operation.

Figure 2:
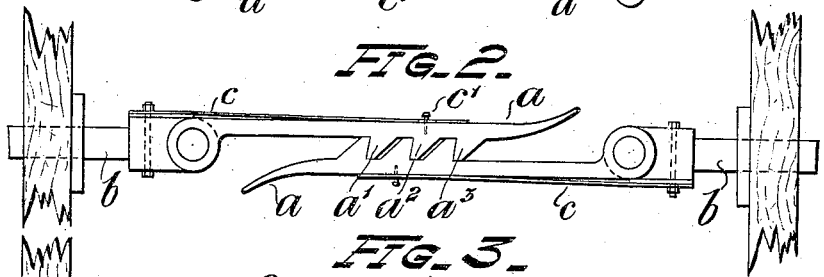
Figure 3:
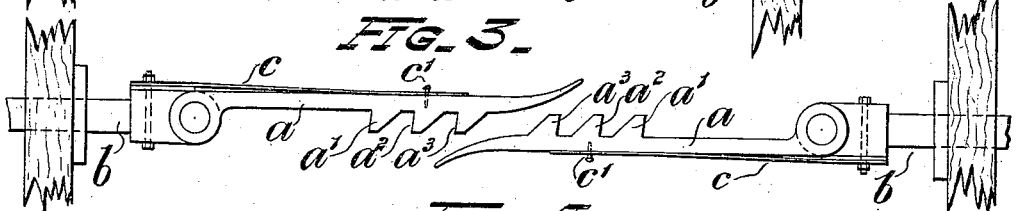
Figure 4:
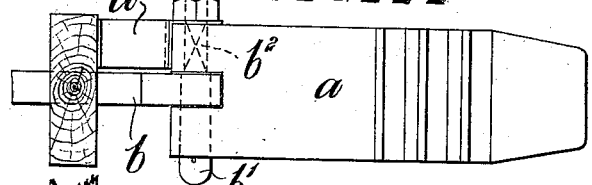
Figure 5:
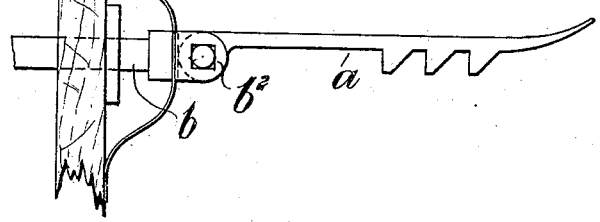
Figure 6:
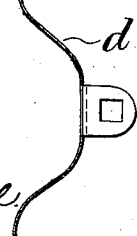

Having thus indicated in general terms the leading characteristic of my invention, in order that it may be clearly understood and readily carried into effect, I will proceed to further describe the same with reference to the accompanying drawings, in which Figure 1 is a side elevation, and Fig. 2 a corresponding plan view showing a portion of the headstocks of two railway carriages coupled together in accordance with my invention; while Fig. 3 is a plan view of two coupling plates in their normal position ready to be coupled when the carriages are shunted together. Fig. 4 is a side elevation and Fig. 5 a corresponding plan of a coupling plate furnished with an alternative form of spring; Fig. 6 being a detail plan view of the said spring. Figs. 7, 8 and 9 illustrate a modification of my coupling plate, Fig. 7 being a side elevation, Fig. 8 a plan view, and Fig. 9 a transverse sectional view taken on line $x\ x$ of Fig. 7. Figs. 10, 11, 12 and 13 illustrate further modifications of my invention as hereinafter described.

According to my invention as shown in Figs. 1, 2 and 3 the coupling includes the arrangement, combination and action of the several parts in a manner similar to that described in the previous specification of Letters Patent No. 835914, excepting that the hook and eye are omitted and superseded by rack teeth or serrations which are pitched in succession as required along the plate. Each coupling plate $a$ where it connects to the draw-bar $b$ of the carriage is set to one side of the center line, so that when coupled together the parts as a whole are central with the carriage. The coupling plates $a$ may be furnished with one, two, three or more teeth $a^1\ a^2\ a^3$ as desired, which teeth are so formed and registered on the plates that when the carriages are shunted together they automatically couple buffer-tight in one operation, the carriage tightness being capable of regulation to any required degree of tension, provision being made as hereinafter described to prevent the buffers from becoming iron-bound or too rigidly braced together when more than one tooth is employed. The teeth may be either set square with the plate at the gripping edge as shown in Figs. 4 and 5, or they may be dovetailed as shown in the other figures, and the teeth can be either evenly pitched close together in the usual manner or pitched a little farther apart. By extending the teeth across the full depth of the plate as shown, allowance is made for the wagons being of different height.

The same method of disengaging the coupling plate will be employed as already described in the former specification No. 835914; or the disengaging mechanism can be worked by a lever in connection with the other method if desired. It is also intended to control the attitude of the coupling plate by springs as before, a much longer spring being provided at the outer or off-side of the plate to the teeth. The spring $c$ on the outer side of the coupling plate $a$ acts to restore the plate to its normal position after displacement in either direction. This spring is connected to the draw bar $b$ at one end, and near the other end to the coupling plate $a$ by a slot and stud connection $c^1$.

In Figs. 4, 5 and 6 is illustrated another form of spring which acts as an ordinary wave spring $d$. In this device both the spring $d$ and the coupling plate $a$ are locked to the draw bar $b$, so that a movement of the coupling plate $a$ brings the spring into action, A convenient way of effecting this is by squaring the neck $b^2$ of the draw bar bolt $b^1$, which bolt connects the draw bar $b$ and the coupling plate $a$ with square bolt holes or eyes in corresponding lugs of the wave spring coupling plate as shown in respect of the former in Fig. 6, and of both together in Fig. 5, the nut being omitted to make this clear. Plates are provided on the wagon end for the wave spring to work against. When the teeth engage with each other, as shown in Figs. 1 and 2 the buffers are intended to be buffer-tight. When the carriages by any means get pushed together with undue violence the couplings are liable to be forced beyond the proper cog or tooth and so lock the carriages too tightly together instead of allowing them to re-bound to their normal coupling position i. e. just buffer-tight. To remedy this defect I provide the coupling plate with ribs on as shown in Figs. 7, 8 and 9, in which $e$ represents a rib on top and bottom of coupling from which it will be seen that when the carriages are unusually pressed together the teeth simply slide along the ribs and spring back again with the buffers when the shock is over. Instead of the portion marked $e$ being in the form of ribs, this may be solid right across the coupling plate if desired. It is also proposed for strengthening purposes to place a rib $f$ at top and bottom on back side of coupling, the spring $c$ working between same.

The ribs as described with reference to Figs. 7 and 8 afford a convenient means of affixing to the coupling plate an auxiliary spring device adapted to keep the couplings in proper alinement in case of failure of the main spring.

Referring to Figs. 10 and 11 the part $g$ of the device is integral with the coupling plate, being mounted on the rib. $g^1$ is a corresponding part to $g$ but detached therefrom, the two parts fitting close together only when hemispherical projections on the one register with hemispherical recesses on the other, dislocation being effected when one turns and the other does not; the loose part $g^1$ is therefore set square on the bolt $b^1$ which is itself set square in the eyehole of the draw-bar, consequently the part $g^1$ cannot turn but is forced out when $g$ turns, i. e. when the coupling plate moves on its axis. A spring $h$ in a spring box $h$ held on the bolt $b^1$ by the nut $i$ takes up this outward movement, the compression of the spring being relied on to force the part $g^1$ back again to the register position in doing which it restores the coupling plate to its proper attitude for alinement with its partner coupling plate.

Figs. 12 and 13 illustrate in plan view and side elevation respectively a convenient means for obviating the possibility of over straining the springs $c$ when disengaging by pulling the coupling too far over, by forming the coupling at the joint end with a square shoulder $a^4$ adapted to encounter a projection $b^3$ formed on the draw-bar so that the coupling can only be pulled over as far as required for the purpose of uncoupling.

The invention can be applied to both mineral and passenger traffic to enable the former to work more loosely and the latter to be braced together buffer-tight as hereinbefore set forth.

Having thus set forth my said invention, what I desire to claim and secure by Letters Patent of the United States, is:—

1. In an automatic coupling, the combination of draw bars provided with vertical pivot pins, coupling plates pivotally mounted on said pins so as to swing in a horizontal plane, said coupling plates being each provided with rack teeth, and springs secured to said coupling plates for returning them to their normal position after displacement in either direction, substantially as described.

2. In an automatic coupling, the combination of draw bars, coupling plates pivotally mounted on said draw bars, said coupling plates being provided with rack teeth and with projecting ribs in the rear of said rack teeth, and springs for restoring said coupling plates to their normal positions after they have been displaced, substantially as described.

3. In an automatic coupling, the combination of draw bars, coupling plates pivotally attached thereto, said coupling plates being provided with rack teeth and with projecting ribs located in the rear of said rack teeth, a spring attached to each of said draw bars and to one of said coupling plates by a slot and stud connection, said springs acting to restore said coupling plates to their normal position, and means for limiting the displacement of said coupling plates, substantially as described.

In testimony whereof, I affix my signature, in presence of two witnesses.

REGINALD BOWDEN PARSONS.

Witnesses:
M. DIXON.
CHARLES LARARD.